June 9, 1964     L. B. SLICHTER     3,136,943
GEOPHYSICAL PROSPECTING METHOD UTILIZING THE ELECTRIC
FIELD COMPONENT OF THE EARTH'S NATURAL
TRANSIENT ELECTROMAGNETIC FIELDS
Filed April 30, 1956
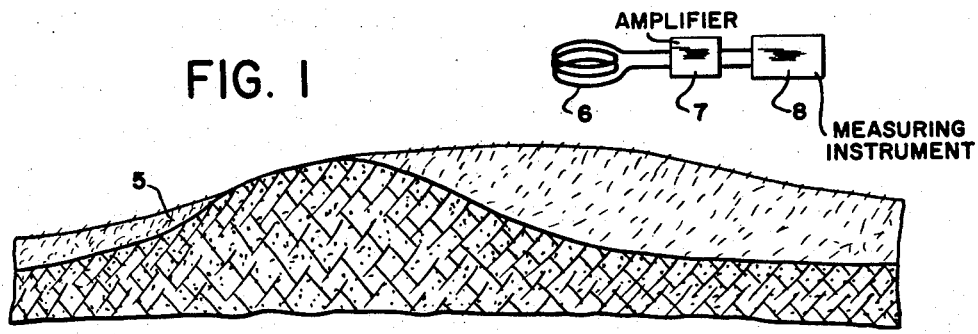
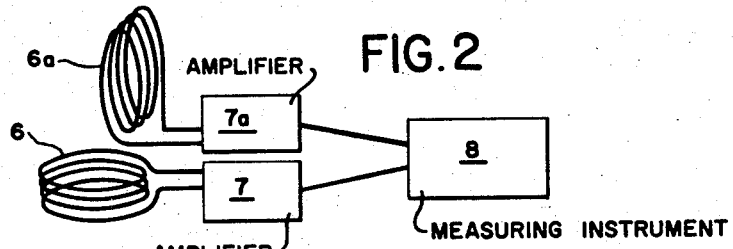
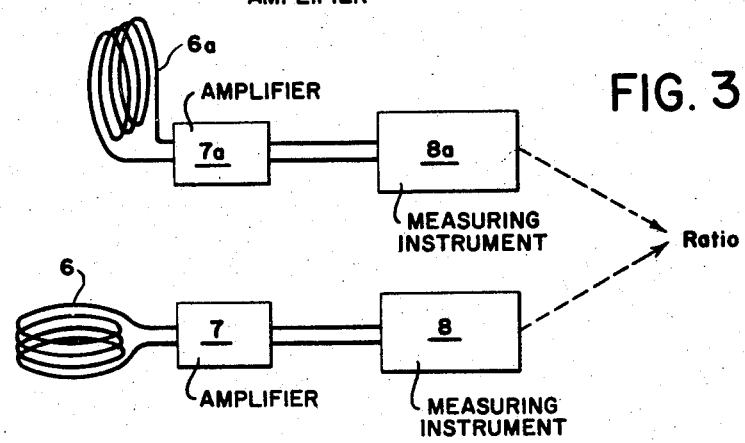
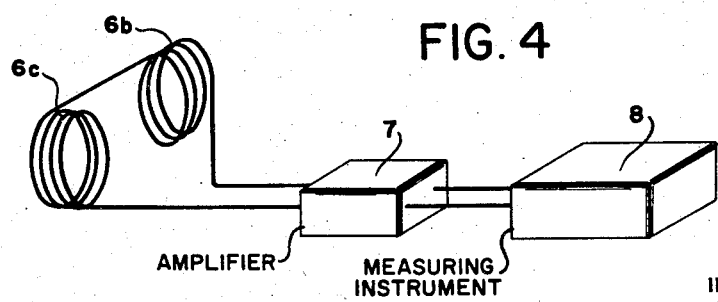
INVENTOR
Louis B. Slichter
BY
ATTORNEYS

United States Patent Office 3,136,943
Patented June 9, 1964

3,136,943
GEOPHYSICAL PROSPECTING METHOD UTILIZING THE ELECTRIC FIELD COMPONENT OF THE EARTH'S NATURAL TRANSIENT ELECTROMAGNETIC FIELDS
Louis B. Slichter, Pacific Palisades, Calif., assignor to The New Jersey Zinc Company, New York, N.Y., a corporation of New Jersey
Filed Apr. 30, 1956, Ser. No. 581,456
3 Claims. (Cl. 324—7)

This invention relates to geophysical prospecting for subterranean deposits and, more particularly, to a method of detecting such deposits by electromagnetic measurement.

In one of the more common processes used for geophysical prospecting, an artificial source of electromagnetic radiation of a specific frequency is stationed on the ground and its electromagnetic field is observed at suitably distributed points in the region being explored. The observed systematic spatial variations of the electromagnetic field provide an indication of anomalous electrical properties, and hence anomalous geophysical properties, of the earth in this region. An inherent disadvantage in this process is that the intensity of the electromagnetic field produced by the source diminishes rapidly as the distance between the source and the point of observation is increased. This restricts the working range of the method and complicates the problem of interpreting the readings in terms of their possible geologic causes.

Another process used for geophysical prospecting, but using the natural fluctuations of the earth's magnetic field rather than an artificial source of electromagnetic radiation, is exemplified by the Untied States patent to Cagniard No. 2,677,801. Pursuant to the process of this patent, electrodes are grounded to the earth at two separated points, and the variation in electrical potential between these two points is observed and is compared with corresponding fluctuations in the earth's relatively steady state magnetic field at the points of measurement. This method not only requires two ground connections and a connecting cable between them but also requires a substantial period of time for taking each measurement of the slow variations in electric potential and in magnetic field strength.

I have now discovered that the relatively high frequency time-variations of natural origin in the earth's electromagnetic field can be utilized to detect anomalies indicative of subterranean ore deposits and the like. This can be done, I have found, by making observations of the natural electromagnetic field and of the systematic spatial variations of this field over the area being explored, all without need in the detecting equipment of any electrical contact with the ground.

Accordingly, the method of geophysical prospecting for subterranean deposits according to my present invention comprises the steps of traversing a predetermined region of the earth to be prospected, measuring local values of the alternating electromagnetic field of the earth during said traverse, and recording these measurements in correlation with the spatial relation of the points of measurement to determine significant anomalies indicative of the subterranean deposits.

The method of my present invention differs from the aforementioned prior art electromagnetic prospecting methods in that it employs no artificial source of electromagnetic radiation and requires no physical contact with the earth. Instead, my method utilizes the naturally occurring alternations in the earth's electromagnetic field of the type known as "magnetic noise" and produced primarily by lightning and other electrical discharges and phenomena. It has been estimated heretofore that natural electrical discharges in the form of lightning occur throughout the world at a rate of about 100 discharges per second. The frequency of these and other electrical discharges is such that, considering the world as a whole, they occur at a substantially uniform rate. Moreover, because the discharges take place throughout the entire world, their resultant effect at any one region of the earth's surface is substantially uniform and their combined electromagnetic effects are detecable at all times over all parts of the world. The resultant fluctuations at a given observing point comprise a wide range of frequencies extending from a fraction of a cycle per second to many thousands of cycles per second. The characteristics of this natural alternating electromagnetic field may thus be observed or measured in any desired frequency-band by tuning sensitive receiving equipment to the approximate frequency desired, in a manner similar to that used in tuning a radio receiver to a desired radio broadcasting station.

The aforementioned electrical discharges produce, as is well known, electromagnetic radiation. Although the radiation is propagated in all directions at the site of the discharge, the vertical magnetic component of this radiation disappears rapidly with distance. Inasmuch as the natural sources of the alternating electromagnetic field of the earth are generally at large distances from the area being explored, the direction of the magnetic vector of the resulting radiation will usually be essentially horizontal, unless this direction is disturbed by the presence in the earth of a region of significant size in which the electrical properties differ from those in the laterally adjacent region. In the latter case, an appreciable vertical component of the magnetic vector will appear and can be measured either independently or in combination with the corresponding horizontal component; a comparison of the measured intensity of the vertical and horizontal components of the magnetic vector, and in particular the measurement of the ratio of these components, is indicative of a locally-induced change in the direction of the magnetic vector of the earth's alternating electromagnetic field.

The cause of the aforementioned change in the earth's alternating electromagnetic field lies in the well known fact that the intensity and character of the electromagnetic anomaly produced by underground regions having electrical properties differing from theose of the neighboring materials depends upon three different factors: (1) the electrical properties of the materials, (2) the dimensions, or size, of the region producing the anomalous electromagnetic observations, and (3) the electromagnetic frequency band being utilized. For best results in detecting these changes in field pursuant to my invention, it is desirable to choose an electromagnetic field frequency appropriate to the size and electrical properties of the geological structure being sought or exploded. Inasmuch as the geological "target" may vary in substance from a small ore body of high electrical conductivity to a large sedimentary oil basin of moderate electrical conductivity, it is advantageous in the practice of the invention to have available a wide choice of frequencies and to select a frequency suited to the specific geological problem. I presently prefer to use frequencies within the normal audio range, and within this range the frequencies between 50 and 5000 cycles per second are particularly useful.

The measurements of the values of changes in the earth's alternating electromagnetic field having the chosen frequency or frequency band include, pursuant to my invention, measurement of changes in the intensity of either the vertical or horizontal components of the magnetic vector (changes in either component being indicative of a change in direction of the magnetic vector), measurement of the ratio of two or all of the three components of the magnetic vector, and measurement of changes in the phase relationship between any one or more of these components of the magnetic vector with respect to the vector of the radiation away from the area being surveyed. It will also be appreciated that, in lieu of the components of the magnetic vector, the corresponding components of the electric vector of the electromagnetic field may also be measured in practicing the invention. Accordingly, the intensity and character of the electromagnetic field at a point in the air above ground (or in a mine working or drill hole underground) may be observed with either of two types of receivers or detectors. In detecting and measuring the so-called electric components of the electromagnetic field, the detector is composed essentially of two plates of a condenser, one of which is a conventional radio antenna and the other is the earth. It is not essential, however, that a ground to earth be used to obtain effect of the second plate. In an airplane, the plane itself serves as the "grounded" plate, and in geophysical equipment used on the ground, the electric vector may similarly be measured without making electrical contact with the ground. In detecting and measuring one or more of the components of the magnetic vector, I use a conventional type of magnetic measurement coil. In accordance with Faraday's principle of electromagnetic induction, the voltage induced across the terminal of the coil is, at any instant, proportional to the mean area of the coil, the number of turns, and time rate of change of the component of the magnetic vector which is normal to the plane of the coil. Thus, the choice of these features of the coil should be selected to give maximum sensitivity in the detector-amplifier device.

Apparatus useful for practicing the invention, and the method of using this apparatus, is shown in the accompanying drawings in which FIG. 1 is a perspective schematic view of the apparatus as used in practicing the invention; and FIGS. 2, 3 and 4 are each schematic views of additional modifications of the apparatus.

In FIG. 1 of the drawings there is illustrated the position of the apparatus with respect to the earth 5 as the apparatus traverses the terrain. The apparatus shown comprises a coil 6 arranged with its turns substantially horizontal (its axis vertical), a tuned amplifier 7 and a measuring instrument 8. In lieu of a single coil used in the apparatus of FIG. 1, two coils 6 and 6a may be used as shown in FIG. 2, each being connected to its own amplifier 7 and 7a, respectively. One of the coils (6) is in the same substantially-horizontal position as used in accordance with FIG. 1 but the other coil 6a is in a plane substantially normal to the plane of the coil 6, i.e. arranged with its turns substantially vertical (its axis horizontal), and the amplified electromagnetic components which these coils detect are compared by using a ratiometer as the measuring instrument 8. Alternatively, as shown in FIG. 3, the same two coils 6 and 6a, similarly positioned normal to one another, may be separately connected to two independent amplifying and measuring units 7–8 and 7a–8a, respectively. The separately measured values of the magnetic components obtained by these separate units are then combined to obtain a single measurement consisting of the ratio of the two vertical and horizontal magnetic component measurements.

Since the horizontal component of the natural electromagnetic field is generated from distant sources nearly equally distributed over the earth in all directions, this component has an intensity nearly independent of the azimuth of the axis of a receiving coil with plane nearly vertical. Therefore, two such coils 6b and 6c, arranged with axes horizontal and mutually perpendicular and wired in series as shown in FIG. 4, produce a received signal voltage which is independent of the polarity or sense in which they are connected. In respect to that part of the earth's magnetic field which is steady in time (and directs the compass needle), the two coils are oriented symmetrically and are so connected electrically that their rotation about their common vertical axis of symmetry will induce no signal. This arrangement is particularly useful in an airplane inasmuch as it eliminates the deleterious affects of yaw of the coil carrier (the plane) and is advantageously used in conjunction with an independent coil with vertical axis (e.g., coil 6 of FIGS. 2 and 3) equipped with its own amplifier and measuring device.

It will be readily understood that radio-type rod antennas may be substituted for the aforementioned magnetic measurement coils in each of the arrangements shown in the drawing. However, each antenna detects the electrical component which is perpendicular to the corresponding magnetic component, and this distinction must be borne in mind in arranging their disposition with respect to the earth.

The vertical and horizontal magnetic and electric component of the aforementioned alternating electromagnetic field of the earth can be readily detected with any electric-signal amplifier of high sensitivity and low background noise. Such amplifiers are well known and available, and hence there is no need to describe them here. The amplifier is merely used to measure the intensity of electric signals within the aforementioned range of frequencies or band of frequencies to which it is tuned.

The resulting measurements of the strength or direction of the magnetic or electrical fields associated with the earth's alternating electromagnetic field, as well as measurements of the variations in their phase relationship (and regardless of whether taken intermittently or continuously), are then correlated with the spatial relation of the points at which the measurements are made. This correlation may be simply tabular or it may be graphically represented. Both types of correlation are effective in ascertaining the geographical location of an anomaly in the earth. And inasmuch as the opacity of the many different compositions of the earth's crust varies individualistically with the frequency of the alternating electromagnetic field of the earth to which it is exposed, the relative strengths of the various frequencies, or of different bands of frequencies, in the measured component or components of the field is indicative of the composition of the detected anomaly. Thus, the method of my invention is inherently capable of growth in utility and in informativeness as the empirical data compiled from its use grow and are interpreted.

The practice of the method of my invention is illustrated by the following procedure. Two conventional magnetic measurement coils, one with its axis horizontal and the other with its axis vertical, were each connected to a separate tuned amplifier. Each amplifier was provided with an output meter to indicate the intensity of the signal detected by each coil. The amplifiers were tuned to receive the range of frequencies between 880 and 920 cycles per second, and each was an amplifier of conventional construction characterized by high sensitivity and low background noise. At each location of the apparatus the value of the intensity indicated by the vertical coil-amplifier arrangement was divided by the value of the intensity indicated by the horizontal coil-amplifier arrangement. The resulting quotient represented the ratio of the vertical component to the horizontal component of the alternating field of the earth at the point of measurement. The value of this ratio as the apparatus was carried over the earth in a land vehicle was recorded on a map of the land measured, the value of each measurement being noted at the point of its measurement on the map. The values of the measurements varied considerably and thus clearly showed changes in the magnetic field direction as the land was traversed. These changes in direction of the magnetic field represented a change in the composition of the earth therebelow, as confirmed by geophysical measurement of the aforementioned conventional type.

I claim:

1. The method of geophysical prospecting for subterranean deposits which comprises the steps of traversing a predetermined region of the earth to be prospected, measuring local values of the substantially horizontal electric component of the alternating electromagnetic field of the earth known as "magnetic noise" during said traverse, and recording these measurements in correlation with the spatial relation of the points of measurement to determine significant anomalies indicative of the subterranean deposits.

2. The method of geophysical prospecting for subterranean deposits which comprises the steps of traversing a predetermined region of the earth to be prospected, measuring local variations in the direction of the electric vector of the alternating electromagnetic field of the earth known as "magnetic noise" during said traverse, and recording these measurements in correlation with the spatial relation of the points of measurement to determine significant anomalies indicative of the subterranean deposits.

3. A method of geophysical prospecting comprising carrying out measurements of at least the electric field component of the natural transient electromagnetic fields of at least one frequency at a plurality of points within an area to be investigated in a manner to detect any time independent spatial variations in at least the electric field component of said transient electromagnetic fields, and recording such spatial variations detected.

References Cited in the file of this patent

UNITED STATES PATENTS

| | | |
|---|---|---|
| 2,103,507 | Zworykin | Dec. 28, 1937 |
| 2,201,256 | Barret | May 21, 1940 |
| 2,559,586 | Bajarnason | July 10, 1951 |
| 2,623,097 | Kunetz | Dec. 23, 1952 |
| 2,677,801 | Cagniard | May 4, 1954 |
| 2,931,974 | McLaughlin et al. | Apr. 5, 1960 |

OTHER REFERENCES

Exploration Geophysic, by Jackosky, 1950, 2nd Ed., pages 592–594, p. 106.